US011824181B2

(12) United States Patent
Schneiders

(10) Patent No.: US 11,824,181 B2
(45) Date of Patent: Nov. 21, 2023

(54) CATHODE OF AN ALL-SOLID-STATE LITHIUM-ION BATTERY AND ALL-SOLID-STATE LITHIUM-ION BATTERY CONTAINING SAID CATHODE

(71) Applicant: ARLANXEO DEUTSCHLAND GMBH, Dormagen (DE)

(72) Inventor: Karola Schneiders, Bergisch Gladbach (DE)

(73) Assignee: ARLANXEO DEUTSCHLAND GMBH, Dormagen (DE)

( * ) Notice: Subject to any disclaimer, the term of this patent is extended or adjusted under 35 U.S.C. 154(b) by 420 days.

(21) Appl. No.: 16/627,582

(22) PCT Filed: Jul. 2, 2018

(86) PCT No.: PCT/EP2018/067753
§ 371 (c)(1),
(2) Date: Dec. 30, 2019

(87) PCT Pub. No.: WO2019/007875
PCT Pub. Date: Jan. 10, 2019

(65) Prior Publication Data
US 2020/0152957 A1 May 14, 2020

(30) Foreign Application Priority Data
Jul. 3, 2017 (EP) .................... 17179379

(51) Int. Cl.
*H01M 4/136* (2010.01)
*H01M 4/04* (2006.01)
*H01M 4/62* (2006.01)
*H01M 10/0525* (2010.01)
*H01M 10/0562* (2010.01)

(52) U.S. Cl.
CPC ......... *H01M 4/0402* (2013.01); *H01M 4/622* (2013.01); *H01M 10/0525* (2013.01); *H01M 10/0562* (2013.01); *H01M 2300/004* (2013.01); *H01M 2300/0068* (2013.01)

(58) Field of Classification Search
None
See application file for complete search history.

(56) References Cited

U.S. PATENT DOCUMENTS

| 10,290,872 B2 | 5/2019 | Jeong |
| 2015/0030922 A1 | 1/2015 | Kobayashi et al. |
| 2015/0050554 A1 | 2/2015 | Fukumine et al. |
| 2016/0322639 A1 | 11/2016 | Jeong |
| 2018/0251638 A1 | 9/2018 | Kwon et al. |

FOREIGN PATENT DOCUMENTS

| DE | 10 2015 225 719 A1 | 11/2016 |
| EP | 2 822 067 A1 | 1/2015 |
| JP | 2013206598 A | 10/2013 |
| JP | 2015128013 A | 7/2015 |
| KR | 2017-0037509 A | 4/2017 |
| WO | 2012026583 A1 | 3/2012 |
| WO | 2015151501 A1 | 8/2015 |
| WO | 2017002361 A1 | 5/2017 |

OTHER PUBLICATIONS

International Search Report dated Aug. 22, 2018, in connection with PCT International Application No. PCT/EP2018/067753.
Written Opinion dated Aug. 22, 2018, in connection with PCT International Application No. PCT/EP2018/067753.
JP Office Action for corresponding application JP 2019-572599 dated May 16, 2022, with translation.

*Primary Examiner* — Lucas J. O'Donnell
(74) *Attorney, Agent, or Firm* — Norris McLaughlin PA

(57) ABSTRACT

The present disclosure relates to an all-solid-state lithium-ion battery produced by applying onto a substrate a slurry in which an active material, a conductive material, a sulfide-based solid-state electrolyte, a binder and a solvent are mixed, characterized in that the binder is a hydrogenated acrylate-nitrile-butadiene rubber (H-ANBR) which comprises remaining double bonds in an amount of more than 0% and not more than 5.5% based on the total amount of the H-ANBR.

13 Claims, No Drawings

CATHODE OF AN ALL-SOLID-STATE LITHIUM-ION BATTERY AND ALL-SOLID-STATE LITHIUM-ION BATTERY CONTAINING SAID CATHODE

This application is a § 371 national stage of PCT International Application No. PCT/EP2018/067753, filed Jul. 2, 2018, which claims foreign priority benefit under 35 U.S.C. § 119 of European Patent Application No. 17179379.7, filed Jul. 3, 2017, the entire disclosures of each of which are incorporated herein by reference.

TECHNICAL FIELD

The present disclosure relates to an all-solid-state lithium-ion battery produced by applying onto a substrate a slurry in which an active material, a conductive material, a sulfide-based solid-state electrolyte, a binder and a solvent are mixed, characterized in that the binder is a hydrogenated acrylate-nitrile-butadiene rubber (H-ANBR) which comprises remaining double bonds in an amount of more than 0% and not more than 5.5% based on the total amount of the H-ANBR.

BACKGROUND

Secondary batteries have recently been employed extensively in devices spanning from large devices such as automobiles and energy storage systems to small devices such as mobile telephones, camcorders and laptop computers.

Lithium secondary batteries are employed as secondary batteries since lithium secondary batteries have a larger capacity per unit area than nickel-manganese batteries or nickel-cadmium batteries.

However, conventional lithium secondary batteries can easily overheat, have a low energy density of about 360 Wh/kg and a relatively low battery power output and are therefore not suitable as next-generation vehicle batteries.

Consequently, an all-solid-state lithium-ion battery having a greater power output and a higher energy density was developed.

The all-solid-state lithium-ion battery comprises the following: a cathode comprising an active material, a solid-state electrolyte, conductive material, a binder and the like; an anode; and a solid-state electrolyte introduced between the cathode and the anode.

Typical solid-state electrolytes are oxide-based electrolytes and sulfide-based electrolytes. Since the sulfide-based electrolyte has a greater lithium-ion conductivity than the oxide-based electrolyte and is in stable over a wide voltage range the sulfide-based solid-state electrolyte has been more widely employed.

The cathode may contain sulfur as active material and may include a sulfide-based electrolyte. By way of example in the relevant prior art a lithium secondary battery employs a nitrile-butadiene rubber (referred to hereinbelow as "NBR") or a hydrogenated nitrile-butadiene rubber (referred to hereinbelow as "HNBR") as the binder that binds the electrode material. Since existing lithium secondary batteries do not employ sulfide-based compounds, NBR may be used.

The active material is reduced when the battery is discharged and oxidized when the battery is charged. This causes the volume of the active material to change. This generates an interfacial resistance between the cathode materials, and the binder can reduce the interfacial resistance.

The NBR hitherto used in some lithium secondary batteries has the following formula 1.

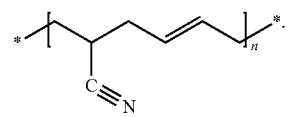

Nitrile butadiene rubber (NBR)

NBR is constructed from acrylonitrile repeating units and butadiene repeating units. NBR has a double bond in a carbon chain. The NBR therefore has a high reactivity toward an active material of the all-solid-state lithium-ion battery and a sulfide-based compound such as a sulfide-based solid-state electrolyte. NBR undergoes hardening when it is reacted with a sulfide-based compound and therefore fails in its attenuation of the interfacial resistance between the cathode materials. Since the volume of active material continues to undergo alternating expansion and compression with the charging and discharging cycles, cracks are formed in the electrode coating and the battery.

The HNBR hitherto used in some lithium secondary batteries has the following formula shown in formula 2.

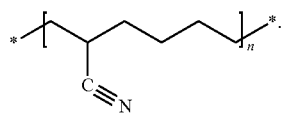

Hydrogenated nitrile-butadiene rubber (HNBR)

HNBR is obtained by adding hydrogen to the NBR to remove the double bonds from the carbon chain. Accordingly, HNBR is chemically stable and has a relatively low reactivity toward the sulfide-based compound.

Since all-solid-state lithium-ion batteries employ a sulfide-based solid-state electrolyte said electrolye can undergo a chemical reaction with the NBR. When charging and discharging of the battery is repeated in accordance with the customary usage of batteries the NBR can undergo hardening.

DE 10 2015 225 719 A1 discloses a cathode of an all-solid-state lithium-ion battery produced by applying onto a substrate a slurry in which an active material, a conductive material, a sulfide-based solid-state electrolyte and a binder are mixed, wherein the binder is a hydrogenated nitrile-butadiene rubber (HNBR) which comprises remaining double bonds in an amount of more than 0% and not more than 5.5% based on the total amount of the HNBR.

HNBR having a low content of acrylonitrile (ACN) of 15% to 30% by weight has the disadvantage that at the low temperatures at which the batteries are used it has a high crystallinity (crystallinity of up to 14%) and thus loses its properties. In addition HNBR has a low adhesion to the conductive material and the electrode material.

It is accordingly an object of the present invention to solve the abovementioned problems in connection with the prior art and to provide a binder which has a low reactivity toward a sulfide based compound in an all-solid-state lithium-ion battery and which goes into solution without forming precipitate. It is a further object of the invention to provide binders having a high adhesion toward conductive materials. It is a further object of the invention to provide binders which also exhibit an excellent dispersibility of active material and thus allow production of a uniform electrode (US-A-2015/0030922, US-A-2015/0050554).

In one aspect the present invention provides a binder and a solvent that can completely dissolve a binder.

The objective of the present invention is not limited to the abovementioned objective. Said objective will become more readily apparent from the following description and is realized by the means described in the claims and by combinations thereof.

The present invention includes the following construction to achieve the abovementioned objective.

An inventive cathode of an all-solid-state lithium-ion battery may be produced by application of a slurry in which sulfide, a conductive material, a sulfide-based solid-state electrolyte and a binder are mixed.

The slurry comprises a solvent which dissolves the binder. The solvent comprises cyclopentyl methyl ether (referred to hereinbelow as "CPME"), xylene (o-xylene, m-xylene, p-xylene) or heptane or a mixture of cyclopentyl methyl ether (CPME), the xylene or heptane and a ketone-based solvent. In preferred embodiments the ketone-based solvent is acetone or methyl ethyl ketone (MEK). In further preferred embodiments the CPME and the ketone-based solvent are mixed in a weight ratio of 9.9:1 to 8:2.

The object is achieved by a binder compost of hydrogenated acrylate-nitrile-diene rubber (H-ANBR) which comprises remaining double bonds in an amount of more than 0% and not more than 5.5%, preferably in an amount of more than 0% and not more than 0.9%

The object is achieved by a cathode of and all-solid-state lithium-ion battery produced by applying onto a substrate a slurry in which an active material, a conductive material, a sulfide-based solid-state electrolyte and a binder are mixed, wherein the binder is a hydrogenated acrylate-nitrile-butadiene rubber (H-ANBR) which comprises remaining double bonds in an amount of more than 0% and not more than 5.5%, preferably of more than 0% and not more than 0.9%.

The H-ANBR has a nitrile content of preferably 15% to 30% by weight, particularly preferably 21% to 30% by weight, and an acrylate content of preferably 20% to 40% by weight, particularly preferably 25% to 35% by weight, based on the total amount of the H-ANBR.

In a preferred embodiment of the H-ANBR the remaining double bond content is 5.5%, the nitrile content is 21% by weight and the acrylate content is 25% by weight.

In a further preferred embodiment of the H-ANBR the amount of remaining double bonds is 0.9%, the nitrile content is 21% by weight and the acrylate content is 25% by weight.

In a further preferred embodiment of the H-ANBR the amount of remaining double bonds is 5.5%, the nitrile content is 25% by weight and the acrylate content is 25% by weight.

An inventive cathode of the all-solid-state lithium-ion battery exhibits a relatively low degree of hardening of the binder during charging and discharging of the battery.

In the cathode according to the invention the binder is uniformly dispersed.

The all-solid-state lithium-ion battery according to the invention exhibits an improved discharging capacity and prolonged lifetime.

The above mentioned features and further features of the invention are discussed hereinbelow.

DETAILED DESCRIPTION

Hereinbelow, detailed reference is now made to various embodiments of the present inventive concept whose examples are described below. The invention is described in connection with exemplary embodiments it will be appreciated that the present description is not intended to limit the invention to these exemplary embodiments. On the contrary, the invention shall not only cover the exemplary embodiments but also various alternatives, modifications, equivalents and other embodiments which may be included within the spirit and scope of the invention as defined by the accompanying claims.

An inventive cathode of an all-solid-state lithium-ion battery may be produced by dissolving an H-ANBR binder in a solvent, admixing an active material, a conductive material and a solid-state electrolyte to produce a slurry and applying the slurry onto a substrate. The slurry may further include a dispersant.

Employable as the active material are sulfide-based active material such as sulfur or an oxide-based active materials such as lithium-nickel-cobalt-manganese oxide (NCM), lithium-nickel-cobalt-aluminum oxide (NCA) and lithium-cobalt oxide (LCO).

The conductive material imparts conductivity to the cathode. During the discharging process of the all-solid-state lithium-ion battery electrons come into contact with the active material, thus reducing said material. To this end the electrodes must be able to move freely within the cathode. The conduct material having a relatively high conductivity is therefore required for electron movement. Employable as the conductive materials are carbon black, Ketjenblack, graphite powder and the like.

The solid-state electrolyte allows movement of the lithium ions within the electrode.

Employable as the solid-state electrolyte is an amorphous oxide-based solid state electrolyte. In certain embodiments a sulfide-based solid state electrolyte is employed for a high discharging capacity. Employable as the sulfide-based solid state electrolyte are $Li_2S$, $Li_2S—P_2S_5$, $Li_2S—SiS_2$, $Li_2S—GeS_2$, $Li_2S—B_2S_5$, $Li_2S—Al_2S_5$ and the like.

Hereinbelow the term "sulfide-based compound" refers in some embodiments to a sulfide-based solid-state electrolyte or in other embodiments to an active material such as a sulfide-based solid-state electrolyte and sulfur.

The binder joins the cathode materials such as for example an active material, a conductive material and a solid-state electrolyte to one another.

The inventive cathode of the all-solid-state lithium-ion battery employs a hydrogenated acrylate-nitrile-butadiene rubber (referred to hereinbelow as "H-ANBR") as binder.

The H-ANBR employed according to the invention typically has the following formula shown in formula 3

(Formula 3)

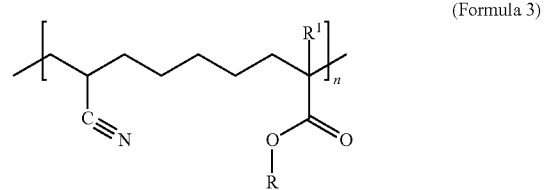

wherein

R represents hydrogen or an esterified radical such as for example alkyl, preferably $C_1$-$C_{18}$-alkyl, particularly preferably $C_1$-$C_8$ alkyl, very particularly preferably butyl, alkoxyalkyl, or polyethylene glycol radical (—($CH_2$—$CH_2$)$_n$—$OR^2$) or hydroxyalkyl and $R^1$ represents hydrogen or alkyl, preferably hydrogen or methyl, The following factors are important in order to employ the H-ANBR for the inventive cathode of the all-solid-state lithium-ion battery.

1) amount of remaining double bonds
2) amount of nitrile monomer
3) type of termonomer The amount of remaining double bonds (RDB) refers to the amount of double bonds remaining in the carbon chain of the H-ANBR. Hereinbelow the amount of remaining double bonds is expressed in "%". The term "%" in the amount of remaining double bonds describes the ratio of repeating units in which the double bond was not removed divided by the total number of originally present repeating units of C=C double bonds (i.e. by the sum of C—C and C=C bonds in the hydrogenated nitrile rubber).

$$RDB(\%) = [C=C]/([C=C]+[C-C])*100$$

Hereinbelow the amount of nitrile repeating units is reported in "% by weight" based on the total amount of polymer. The H-ANBR of the binders according to the invention is constructed from nitrile repeating units, butadiene repeating units and acrylate repeating units.

When the remaining amount of double bonds is more than 0% and not more than 5.5% the H-ANBR has a sufficiently low reactivity toward a sulfide-based compound to ensure that the H-ANBR does not undergo hardening. In preferred embodiments the remaining amount of double bonds is more than 0% and not more than 0.9%.

When the amount of nitrile repeating units is between 15% and 30% by weight and simultaneously the amount of acrylate is from 20% to 40% by weight, preferably 25% to 35% by weight, the H-ANBR may be completely dissolved in a suitable solvent since the dielectric constant of the solvent changes according to the amount of nitrile repeating units. The solubility of the H-ANBR accordingly varies. If the H-ANBR is not dissolved in the solvent the H-ANBR is not uniformly dispersed when the cathode is produced.

Employable as the nitrile monomer that forms the α,β-ethylenically unsaturated nitrile units is any known α,β-ethylenically unsaturated nitrile. Preference is given to ($C_3$-$C_5$)-α,β-ethylenically unsaturated nitriles such as acrylonitrile, α-haloacrylonitrile, for example α-chloroacrylonitrile and α-bromoacrylonitrile, α-alkylacrylonitrile, for example methacrylonitrile, ethacrylonitrile or mixtures of two or more α,β-ethylenically unsaturated nitriles. Acrylonitrile, methacrylonitrile, ethacrylonitrile or mixtures thereof are particularly preferred. Acrylonitrile is very particularly preferred.

The amount of α,β-ethylenically unsaturated nitrile units is typically in the range from 0.1% to 50% by weight, preferably 10% to 45% by weight, particularly preferably from 15% to 30% by weight and very particularly preferably 21% to 29% based on the total amount of monomer units in the H-ANBR.

Conjugated Diene

The conjugated diene which forms the conjugated diene units may be of any nature, especially conjugated $C_4$-$C_{12}$ dienes. Preference is given to 1,3-butadiene, isoprene, 2,3-dimethylbutadiene, 1,3-pentadiene (piperylene) or mixtures thereof 1,3-Butadiene and isoprene or mixtures thereof are particularly preferred. 1,3-Butadiene is very particularly preferred.

The amount of conjugated diene units is typically in the range from 15% to 79.9% by weight, preferably 20% to 65% by weight and particularly preferably 35% to 55% by weight based on the total amount of monomer units in the H-ANBR.

Acrylate Monomer

Acrylate monomers which form the acrylate units are to be understood as meaning copolymerizable monomers having at least one esterified carboxyl group in the monomer molecule.

Contemplated acrylate monomers are for example esters of the α,β-unsaturated monocarboxylic acids. Employable esters of the α,β-unsaturated monocarboxylic acids are the alkyl esters and alkoxyalkyl esters thereof. Preference is given to the alkyl esters, in particular $C_1$-$C_{18}$ alkyl esters, of the α,β-unsaturated monocarboxylic acids, particular preference to alkyl esters, in particular $C_1$-$C_{18}$ alkyl esters, of acrylic acid or of methacrylic acid, in particular methyl acrylate, ethyl acrylate, propyl acrylate, n-butyl acrylate, tert-butyl acrylate, 2-ethylhexyl acrylate, n-dodecyl acrylate, methyl methacrylate, ethyl methacrylate, butyl methacrylate and 2-ethylhexyl methacrylate. Preference is also given to alkoxyalkyl esters of the α,β-unsaturated monocarboxylic acids, particular preference to alkoxyalkyl esters of acrylic acid or of methacrylic acid, in particular $C_2$-$C_{12}$-alkoxyalkyl esters of acrylic acid or of methacrylic acid, very particular preference to methoxymethyl acrylate, methoxyethyl (meth)acrylate, ethoxyethyl (meth)acrylate and methoxyethyl (meth)acrylate. Also employable are mixtures of alkyl esters, for example those mentioned above, with alkoxyalkyl esters, for example in the form of those mentioned above. Also employable are hydroxyalkyl acrylates and hydroxyalkyl methacrylate in which the number of carbon atoms in the hydroxyalkyl groups is 1-12, preferably 2-hydroxyethyl acrylate, 2-hydroxyethyl methacrylate and 3-hydroxypropyl acrylate. Likewise employable are epoxy-containing esters, for example glycidyl methacrylate. Also employable are cyanoalkyl acrylates and cyanoalkyl methacrylates, having 2-12 carbon atoms in the cyanoalkyl group, preferably α-cyanoethyl acrylate, β-cyanoethyl acrylate and cyanobutyl methacrylate. Also employable are fluorine-substituted benzyl-containing acrylates or methacrylates, preferably fluorobenzyl acrylate and fluorobenzyl methacrylate. Also employable are fluoroalkyl-containing acrylates and methacrylates, preferably trifluoroethyl acrylate and tetrafluoropropyl methacrylate. Also employable are amino-containing α,β-unsaturated carboxylic esters such as dimethylaminomethyl acrylate and diethylaminoethyl acrylate.

Also employable are diesters of α,β-unsaturated dicarboxylic acids, for example in the form of the alkyl diesters, preferably $C_1$-$C_{10}$-alkyl diesters, in particular ethyl, n-propyl, isopropyl, n-butyl, tert-butyl, n-pentyl or n-hexyl diesters, cycloalkyl diesters, preferably $C_5$-$C_{12}$-cycloalkyl diesters, particularly preferably $C_6$-$C_{12}$-cycloalkyl diesters, alkylcycloalkyl diesters, preferably $C_6$-$C_{12}$-alkylcycloalkyl diesters, particularly preferably $C_7$-$C_{10}$-alkylcycloalkyl diesters, aryl diesters, preferably $C_6$-$C_{14}$-aryl diesters, each of which may also be mixed esters.

Examples of α,β-unsaturated dicarboxylic diesters include dialkyl maleates, preferably dimethyl maleate, diethyl maleate, dipropyl maleate and di-n-butyl maleate;
dicycloalkyl maleates, preferably dicyclopentyl maleate, dicyclohexyl maleate and dicycloheptyl maleate;

dialkylcycloalkyl maleates, preferably dimethylcyclopentyl maleate and diethylcyclohexyl maleate;
diaryl maleates, preferably diphenyl maleate;
dibenzyl maleates, preferably dibenzyl maleate;
dialkyl fumarates, preferably dimethyl fumarate, diethyl fumarate, dipropyl fumarate and di-n-butyl fumarate;
dicycloalkyl fumarates, preferably dicyclopentyl fumarate, dicyclohexyl fumarate and dicycloheptyl fumarate;
dialkylcycloalkyl fumarates, preferably dimethylcyclopentyl fumarate and diethylcyclohexyl fumarate;
diaryl fumarates, preferably diphenyl fumarate;
dibenzyl fumarates, preferably dibenzyl fumarate;
dialkyl citraconates, preferably dimethyl citraconate, diethyl citraconate, dipropyl citraconate and di-n-butyl citraconate;
dicycloalkyl citraconates, preferably dicyclopentyl citraconate, dicyclohexyl citraconate and dicycloheptyl citraconate;
dialkylcycloalkyl citraconates, preferably dimethylcyclopentyl citraconate and diethylcyclohexyl citraconate;
diaryl citraconates, preferably diphenyl citraconate;
dibenzyl citraconates, preferably dibenzyl citraconate;
dialkyl itaconates, preferably dimethyl itaconate, diethyl itaconate, dipropyl itaconate and di-n-butyl itaconate;
dicycloalkyl itaconates, preferably dicyclopentyl itaconate, dicyclohexyl itaconate and dicycloheptyl itaconate;
dialkylcycloalkyl itaconates, preferably dimethylcyclopentyl itaconate and diethylcyclohexyl itaconate;
diaryl itaconates, preferably diphenyl itaconate;
dibenzyl itaconates, preferably dibenzyl itaconate, and
dialkyl mesaconates, preferably diethyl mesaconate.

Suitable acrylate monomers further include PEG acrylates of general formula (I)

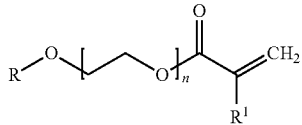

(Formula I)

wherein R is hydrogen or branched or unbranched $C_1$-$C_{20}$-alkyl, preferably methyl, ethyl, butyl or ethylhexyl, n is 1 to 8, preferably 2 to 8, particularly preferably 2 to 5 and very particularly preferably 3 and $R^1$ is hydrogen or $CH_3$—. In the context of the present invention the term "(meth)acrylate" is to be understood as meaning "acrylate" and "methacrylate". When the $R^1$ radical in general formula (I) is $CH_3$—, a methacrylate is concerned. In the context of the present invention the term "polyethylene glycol"/the abbreviation "PEG" is to be understood as meaning both monoethylene glycol sections having one ethylene glycol repeating unit (PEG-1; n=1) and polyethylene glycol sections having 2 to 8 ethylene glycol repeating units (PEG-2 to PEG-8; n=2 to 8). The term "PEG acrylate" is also abbreviated to PEG-X-(M)A, wherein "X" represents the number of ethylene glycol repeating units, "MA" stands for methacrylate and "A" for acrylate. In the context of the present invention acrylate units derived from PEG acrylates of general formula (I) are referred to as "PEG acrylate unit". A preferred PEG acrylate is butyl diethylene glycol methacrylate (BDGMA). These PEG acrylates are commercially available, for example from Arkema under the trade name Sartomer®, from Evonik under the trade name Visiomer® or from Sigma Aldrich.

Also employable are monoesters of α,β-unsaturated dicarboxylic acids, for example in the form of the alkyl monoesters, preferably $C_1$-$C_{10}$-alkyl monoesters, in particular ethyl, n-propyl, isopropyl, n-butyl, tert-butyl, n-pentyl or n-hexyl monoesters, cycloalkyl monoesters, preferably $C_5$-$C_{12}$-cycloalkyl monoesters, particularly preferably $C_6$-$C_{12}$-cycloalkyl monoesters, alkylcycloalkyl monoesters, preferably $C_6$-$C_{12}$-alkylcycloalkyl monoesters, particularly preferably $C_7$-$C_{10}$-alkylcycloalkyl monoesters, aryl monoesters, preferably $C_6$-$C_{14}$-aryl monoesters.

Examples of α,β-unsaturated dicarboxylic monoesters include
monoalkyl maleates, preferably monomethyl maleate, monoethyl maleate, monopropyl maleate and mono-n-butyl maleate;
monocycloalkyl maleates, preferably monocyclopentyl maleate, monocyclohexyl maleate and monocycloheptyl maleate;
monoalkylcycloalkyl maleates, preferably monomethylcyclopentyl maleate and monoethylcyclohexyl maleate;
monoaryl maleates, preferably monophenyl maleate;
monobenzyl maleates, preferably monobenzyl maleate;
monoalkyl fumarates, preferably monomethyl fumarate, monoethyl fumarate, monopropyl fumarate and mono-n-butyl fumarate;
monocycloalkyl fumarates, preferably monocyclopentyl fumarate, monocyclohexyl fumarate and monocycloheptyl fumarate;
monoalkylcycloalkyl fumarates, preferably monomethylcyclopentyl fumarate and monoethylcyclohexyl fumarate;
monoaryl fumarates, preferably monophenyl fumarate;
monobenzyl fumarates, preferably monobenzyl fumarate;
monoalkyl citraconates, preferably monomethyl citraconate, monoethyl citraconate, monopropyl citraconate and mono-n-butyl citraconate;
monocycloalkyl citraconates, preferably monocyclopentyl citraconate, monocyclohexyl citraconate and monocycloheptyl citraconate;
monoalkylcycloalkyl citraconates, preferably monomethylcyclopentyl citraconate and monoethylcyclohexyl citraconate;
monoaryl citraconates, preferably monophenyl citraconate;
monobenzyl citraconates, preferably monobenzyl citraconate;
monoalkyl itaconates, preferably monomethyl itaconate, monoethyl itaconate, monopropyl itaconate and mono-n-butyl itaconate;
monocycloalkyl itaconates, preferably monocyclopentyl itaconate, monocyclohexyl itaconate and monocycloheptyl itaconate;
monoalkylcycloalkyl itaconates, preferably monomethylcyclopentyl itaconate and monoethylcyclohexyl itaconate;
monoaryl itaconates, preferably monophenyl itaconate;
monobenzyl itaconates, preferably monobenzyl itaconate.
monoalkyl mesaconates, preferably monoethyl mesaconate.

The proportion of the acrylate units in the H-ANBR is in the range from 20% to 40% by weight, preferably from 25% to 35% by weight, based on the total amount of monomer units in the hydrogenated carboxylated nitrile rubber latex.

When the H-ANBR has an amount of remaining double bonds of more than 0% and not more than 5.5% the H-ANBR has a lower reactivity toward sulfide-based compounds so that the H-ANBR does not undergo hardening during charging and discharging of the all-solid-state lithium-ion battery. Since the interfacial resistance between the cathode materials such as the active material can thus be sufficiently reduced the capacity of the battery is retained over a plurality of charging and discharging operations and lifetime is increased.

The invention is described in detail hereinbelow with reference to the examples.

EXAMPLES

The following examples illustrate the present invention and shall not have a limiting effect on said invention.

Examples 1 to 3 and Comparative Examples 1 and 2

H-ANBR having an RDB content, a butyl acrylate content and a nitrile content as reported in table 1 below was produced. Three HNBR types with different nitrile contents and without an acrylate content were employed as comparative examples (CE) 1 and 2.

TABLE 1

Composition of H-ANBR (examples 1 to 3) and HNBR (comparative examples 1 and 2)

| | Ex. 1 H-ANBR | Ex. 2 H-ANBR | Ex. 3 H-ANBR | CE 1 HNBR | CE 2 HNBR |
|---|---|---|---|---|---|
| RDB [%] | ≤10.9 | 5.5 | 5.5 | 1.4 | ≤0.9 |
| Nitrile content [% by weight] | 21 | 21 | 25 | 22 | 26 |
| Acrylate content [% by weight] | 25 | 25 | 25 | 0 | 0 |

Assessment of Solubility

An inventive cathode of an all-solid-state lithium-ion battery includes a solvent that dissolves the binder.

The solvent may suitably be selected according to the production environment and the like. However, since a highly polar solvent can dissolve a sulfide-based solid-state electrolyte a nonpolar or a weakly polar solvent may predominantly be employed. Thus, cyclopentyl methyl ether, xylene or heptane, preferably cyclopentyl methyl ether, may be employed as solvent in the present invention.

To dissolve the binders it is also possible to employ mixed solvents which are obtained by admixing a ketone-based solvent as an auxiliary solvent together with the CPME, xylene or heptane.

Employable ketone-based solvents include acetone or methyl ethyl ketone (MEK).

The ketone-based solvent has a high polarity and the solvent can therefore dissolve a sulfide-based compound. Accordingly the mixed solvent is employed by mixing the CPME, xylene or heptane and the ketone-based solvent in a weight ratio of 9.9:1 to 8:2.

The sulfide-based compound cannot be dissolved when the weight ratio of the CPME and the ketone-based solvent in the mixed solvent is between 9.9:1 to 8:2.

The binders of examples 1 to 3 and of comparative examples 1 and 2 were placed in an amount of 1.5% by weight in a mixture of CPME and acetone in a 9:1 ratio. The results are shown in table 2 which follows.

TABLE 2

Evaluation of dissolution behavior of the binders in cyclopentyl methyl ether/ in a mixture of CPME and acetone (9:1)

| | Ex. 1 H-ANBR | Ex. 2 H-ANBR | Ex. 3 H-ANBR | CE 1 HNBR | CE 2 HNBR |
|---|---|---|---|---|---|
| CPME | dissolved | dissolved | dissolved | turbid | turbid |
| CPME/acetone (9:1) | dissolved | dissolved | dissolved | turbid | turbid |

The H-ANBR binders employed in the examples 1 to 3 were completely dissolved in CPME and in mixtures of CPME and acetone. By contrast the materials from comparative examples 1 and 2 were not dissolved either in pure CPME or in mixtures of CPME and acetone.

H-ANBR having a nitrile content of 15% to 30% by weight may be completely dissolved in pure CPME as solvent.

Production of an all-Solid-State Lithium-Ion Battery

Production Example 1

A slurry was produced by completely dissolving the H-ANBR from example 2 in a mixed solvent and subsequently admixing sulfur, (active material), Ketjenblack (conductive material), a sulfide-based solid-state electrolyte and a dispersant.

A cathode was produced by applying the slurry onto a current collector. The weight ratio of each element present is shown in table 3 which follows.

TABLE 3

Composition of slurry

| Constituent | Content [% by weight] |
|---|---|
| Sulfur | 12 |
| Ketjenblack | 2.8 |
| Solid-state electrolyte | 23.2 |
| H-ANBR | 1.2 |
| Dispersant | 0.8 |
| Mixed solvent | 60 |

And all-solid-state lithium-ion battery was produced by forming a solid-state electrolyte layer on the top side of the cathode and forming an anode on the top side of the solid-state electrolyte layer.

It is apparent from the measurement of the discharging capacities of the all-solid-state lithium-ion batteries produced in the production examples 1 that a high discharging capacity level was measured for production example 1.

The inventive binder is an H-ANBR which comprises an amount of remaining double bonds of more than 0% and not more than 5.5% and thus exhibits a low reactivity toward a sulfide-based compound. Accordingly the extent of binder hardening during charging and discharging of the battery is low.

The inventive binder is an H-ANBR which has a nitrile content of 15% to 30% by weight, preferably 21% to 30% by weight, and an acrylate content of 20% to 40% by weight, preferably 25% to 35% by weight, and is therefore completely dissolved in the mixed solvent obtained by mixing CPME and a ketone-based solvent in a ratio of 9:1 to 8:2. The binder can therefore be uniformly dispersed in the cathode.

A uniformly dispersed binder efficaciously reduces the interfacial resistance between the cathode materials. This increases the capacity of the battery and the lifetime thereof.

The invention claimed is:

1. Cathode of an all-solid-state lithium-ion battery comprising a substrate having an active material, a conductive material, a sulfide-based solid-state electrolyte, and a binder, wherein
the binder is a hydrogenated acrylate-nitrile-butadiene rubber (H-ANBR) which comprises remaining double bonds in an amount of more than 0% and not more than 0.9% based on the total amount of the H-ANBR and a nitrile content of 10% to 30% by weight, wherein the binder is configured to be completely dissolved in a solvent comprised of cyclopentyl methyl ether (CPME).

2. Cathode according to claim 1, wherein the cathode further comprises cyclopentyl methyl ether (CPME), xylene, or a mixture of cyclopentyl methyl ether (CPME), xylene and a ketone-based solvent.

3. Cathode according to claim 2, wherein the ketone-based solvent is acetone or methyl ethyl ketone (MEK).

4. Cathode according to claim 2, wherein the cyclopentyl methyl ether (CPME) and the ketone-based solvent are present in a weight ratio of 9.9:1 to 8:2.

5. Cathode according to claim 1, wherein the H-ANBR comprises an amount of nitrile repeating units of 15% to 30% by weight, and an amount of acrylate repeating units of 20% to 40% by weight, based on the total amount of the H-ANBR.

6. Cathode according to claim 1, wherein the amount of remaining double bonds in the H-ANBR is 0.9%, the nitrile content is 21% by weight and the acrylate content is 25% by weight.

7. Cathode according to claim 5, wherein the amount of remaining double bonds in the H-ANBR is 0.9%, the nitrile content is 21% by weight and the acrylate content is 25% by weight.

8. Cathode according to claim 1, wherein the amount of remaining double bonds in the H-ANBR is 0.9%, the nitrile content is 25% by weight and the acrylate content is 25% by weight.

9. All-solid-state lithium-ion battery comprising a cathode, wherein the cathode comprises a substrate having an active material, a conductive material, a sulfide-based solid-state electrolyte and a binder, and wherein the binder is a hydrogenated acrylate-nitrile-butadiene rubber (H-ANBR) which comprises remaining double bonds in an amount of more than 0% and not more than 5.5% and a nitrile content of 10% to 30% by weight, wherein the binder is configured to be completely dissolved in a solvent comprised of cyclopentyl methyl ether (CPME).

10. Cathode according to claim 9, wherein the substrate contains cyclopentyl methyl ether (CPME).

11. Cathode according to claim 5, wherein the H-ANBR comprises an amount of nitrile repeating units of 21% to 30% by weight.

12. Cathode according to claim 5, wherein the H-ANBR comprises an amount of acrylate repeating units of 25% to 35% by weight, based on the total amount of the H-ANBR.

13. All-solid-state lithium-ion battery according to claim 9, wherein the H-ANBR comprises remaining double bonds in an amount of more than 0% and not more than 0.9%.

* * * * *